(12) United States Patent
Lv

(10) Patent No.: US 11,725,826 B2
(45) Date of Patent: Aug. 15, 2023

(54) INFRARED STOVE AND INFRARED SPLIT STOVE SET

(71) Applicant: Zhejiang Deermaple Outdoor Products Co., Ltd, Jinhua (CN)

(72) Inventor: Qiding Lv, Jinhua (CN)

(73) Assignee: Zhejiang Deermaple Outdoor Products Co., Ltd, Jinhua (CN)

( * ) Notice: Subject to any disclaimer, the term of this patent is extended or adjusted under 35 U.S.C. 154(b) by 343 days.

(21) Appl. No.: 17/139,351

(22) Filed: Dec. 31, 2020

(65) Prior Publication Data

US 2021/0262667 A1   Aug. 26, 2021

(30) Foreign Application Priority Data

Feb. 24, 2020  (CN) .......................... 202020201424.5
Nov. 24, 2020  (CN) .......................... 202022748985.X

(51) Int. Cl.
*F24C 3/00*  (2006.01)
*G05D 16/06*  (2006.01)
*F24C 15/08*  (2006.01)

(52) U.S. Cl.
CPC .............. *F24C 3/002* (2013.01); *F24C 15/08* (2013.01); *G05D 16/06* (2013.01)

(58) Field of Classification Search
CPC ...... G05D 16/0669; G05D 16/06; F24C 3/14; F24C 15/08; F24C 3/067; F24C 3/002
See application file for complete search history.

(56) References Cited

U.S. PATENT DOCUMENTS

| | | | | |
|---|---|---|---|---|
| 3,139,879 | A * | 7/1964 | Bauer | F23D 14/28 126/93 |
| 5,816,235 | A * | 10/1998 | Kim | F23N 5/02 126/39 J |
| 2010/0154770 | A1 * | 6/2010 | Zhou | F24C 3/14 126/39 R |
| 2018/0023816 | A1 * | 1/2018 | Kim | F24C 3/14 126/38 |

FOREIGN PATENT DOCUMENTS

| KR | 101909011 | * | 10/2018 |
|----|-----------|---|---------|
| KR | 102187602 | * | 12/2020 |

* cited by examiner

*Primary Examiner* — Alfred Basichas
(74) *Attorney, Agent, or Firm* — Schwegman Lundberg & Woessner, P.A.

(57) ABSTRACT

The application discloses an infrared stove and an infrared split stove set. The infrared stove includes an outer casing, an inner cover, an ejector tube, a gas nozzle and an infrared reaction layer. The inner cover is nested with the outer casing to form a stove body. The infrared reaction layer is provided on the stove body. A first accommodating cavity is provided between the infrared reaction layer and the inner cover. A second accommodating cavity is provided between the inner cover and the outer casing. The ejector tube is arranged on the inner cover, communicates with the first accommodating cavity and the second accommodating cavity, and has a gas inlet. The gas nozzle is arranged on the outer casing, and is arranged opposite to the gas inlet and at a spacing. The infrared stove adopts flameless combustion, with more stability, more resistance to severe environments, and better windproof property.

15 Claims, 7 Drawing Sheets

INFRARED STOVE AND INFRARED SPLIT STOVE SET

CROSS-REFERENCE TO RELATED APPLICATIONS

This Non-provisional application claims priority under 35 U.S.C. § 119(a) to Chinese Patent Application No. 202020201424.5 filed on Feb. 24, 2020, and to Chinese Patent Application No. 202022748985.X filed on Nov. 24, 2020, the entire contents of which are hereby incorporated by reference in their entirety.

TECHNICAL FIELD

The disclosure relates to outdoor cooking utensils, in particular to an infrared stove and an infrared split stove set.

BACKGROUND ART

With continuous improvement of living standards, more and more outdoor activities have become an essential part of people's life. However, some outdoor enthusiasts carry equipment such as cookware and the like to cook outdoors, therefore there are great market demands for various cooking utensils.

Most burners designed for outdoor activities are low-pressure ejection ones which use low-pressure gas to inject air to burn and do work, and the injecting power originates from a pressure of an air tank in the outdoors. However, since the pressure of the air tank changes with air temperature, service time, altitude and other factors, the use of traditional burners is easily affected by the environment, and their power generally decreases over time. With wind blowing, heat in the stove is easily lost, resulting in a poor cooking and gas waste in the air tank.

SUMMARY

In view of the above problems, the disclosure provides an infrared stove and an infrared split stove set. The infrared stove adopts flameless combustion, with more stability, more resistance to severe environments, and better windproof property.

Technical schemes adopted in the disclosure are as follows. The disclosure provides an infrared stove which includes an outer casing, an inner cover, an ejector tube, a gas nozzle and an infrared reaction layer. The inner cover is nested with the outer casing to form a stove body. The infrared reaction layer is provided on the stove body. A first accommodating cavity is provided between the infrared reaction layer and the inner cover. A second accommodating cavity is provided between the inner cover and the outer casing. The outer casing is provided with an air inlet communicated with outside. The ejector tube is arranged on the inner cover, communicates with the first accommodating cavity and the second accommodating cavity, and is provided with a gas inlet. The gas nozzle is arranged on the outer casing and is arranged immediately opposite to the gas inlet and at a spacing.

In an embodiment of the present disclosure, the ejector tube is located in the first accommodating cavity or the second accommodating cavity.

In an embodiment of the present disclosure, the ejector tube is located in the second accommodating cavity, and the inner cover is provided with a groove which is recessed toward the first accommodating cavity, and the ejector tube is located in the groove.

In an embodiment of the present disclosure, the gas inlet is a straight cylindrical opening or an expansion opening.

In an embodiment of the disclosure, the infrared stove further includes a plurality of supporting legs, and all of the supporting leg are arranged at spacings and rotatably at a bottom of the infrared stove.

In an embodiment of the disclosure, a gasket is provided between the bottom of the infrared stove and the supporting leg. The gasket is mounted on the bottom of the infrared stove, the supporting leg is rotatably mounted on the gasket, the gasket is provided with an arc-shaped limiting groove, and the support leg is provided with a limiting column which is slidably matched with the arc-shaped limiting groove.

The disclosure also provides an infrared split stove set, which includes a pot, a pot shield, a gas tank, a pressure maintaining valve, a connecting conduit and the infrared stove described above. The pot is hollow. The pot shield is hollow and braced against a bottom of the pot. The infrared stove detachably braces against the bottom of the pot shield and embedded in the pot shield. A first end of the connecting conduit is connected with the gas nozzle, a second end of the connecting conduit is connected with the pressure maintaining valve. The pressure maintaining valve is detachably connected with an outlet of the gas tank.

In an embodiment of the disclosure, the pressure maintaining valve includes a valve body, a stem, an adjusting rod, a rear spring, a diaphragm, a diaphragm pressing nail, a throttle spool, a throttle ring, a front spring and a throttle. An inlet is provided on one side of the valve body and is communicated with the gas tank, and an outlet is provided on the other side of the valve body and is communicated with the connecting conduit. The stem is rotatably mounted to the valve body. The adjusting rod is axially and movably mounted inside the stem. An end of the rear spring is connected with the adjusting rod. The diaphragm pressing nail is mounted integrally with the diaphragm, so that the membrane can be pressingly clamped in inner walls on both sides of the valve body, and the other end of the rear spring is connected with the diaphragm pressing nail. The throttle spool is mounted in the valve body, and one end of the throttle spool contacts the diaphragm pressing nail. The throttle ring is sleeved on the throttle spool. The front spring is sleeved on the other end of the throttle spool and is located at the inlet. The throttle is mounted on the inner wall on a side of the valve body and communicated with the outlet, and the throttle ring is detachably contacted with the throttle at an opening and closing point of an air passage.

In an embodiment of the present disclosure, the pressure maintaining valve includes a slide bead which is arranged between the adjusting rod and the rear spring, and a contact surface between the adjusting rod and the slide bead is a spherical surface.

In an embodiment of the disclosure, the pressure maintaining valve includes a rear cap which is fit on a side of the valve body opposite to the inlet and nested on an outer periphery of the stem.

In an embodiment of the present disclosure, the infrared split stove set further includes a container which is arranged in the pot and provided with a third accommodating cavity therein.

In an embodiment of the present disclosure, a size of the gas tank is smaller than a size of the third accommodating cavity. A size of the infrared stove is smaller than a size of an internal cavity of the pot.

In an embodiment of the present disclosure, the infrared split stove set further includes a web and a riveting piece, and the web is fixed to a top of the infrared reaction layer through the riveting piece.

In an embodiment of the present disclosure, a bottom of the container is provided with a concave part which is recessed toward the third accommodating cavity, and the web is provided with a convex part which protrudes away from the infrared reaction layer, and the concave part is matched with the convex part.

In an embodiment of the present disclosure, a bottom of the outer casing is provided with a fixing ring for fixing the pressure maintaining valve.

In an embodiment of the present disclosure, the infrared split stove set includes a heat collecting ring, which is mounted at the bottom of the pot shield.

The disclosure has the following beneficial effects: in the infrared stove and the infrared split stove set provided in the disclosure, with the gas nozzle externally connected with the gas, the air inlet on the outer casing enables the second accommodating cavity to communicate with the outside air. The gas sprayed from the gas nozzle enters the ejector tube, and meanwhile, due to a high-speed motion of a gas flow, the air is injected into the ejector tube, so that the gas and air are premixed in the ejector tube, and then the mixed gas enters the first accommodating cavity for a further mixing. The uniformly distributed mixed gas passes through the infrared reaction layer and burns on a surface of the infrared reaction layer, and the infrared reaction layer is heated to a white heat state after the premixed high-temperature gas is burned, so that infrared rays are radiated outwards to realize a heating. The infrared stove is flameless, safer and more stable in combustion.

Figure 1:
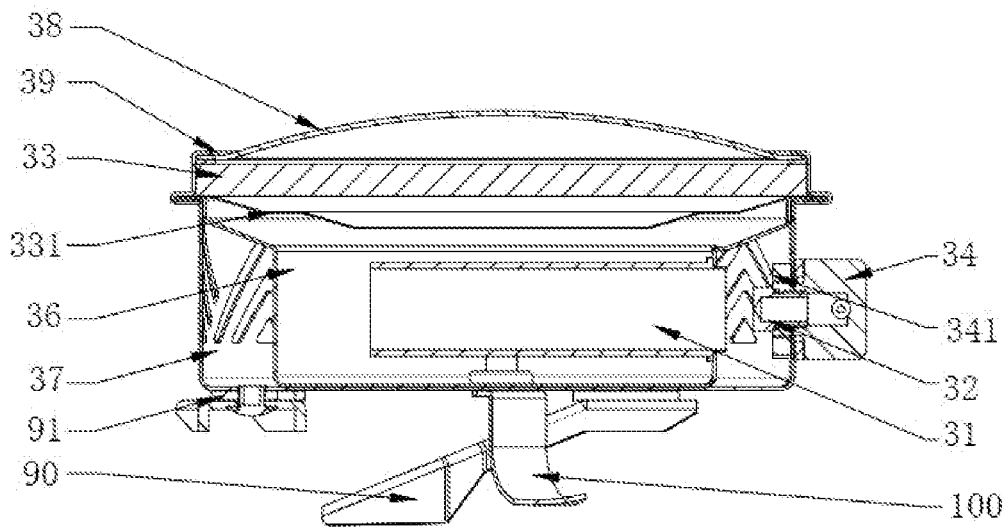
FIG. 1 is a sectional view of an infrared stove according to an embodiment of the present disclosure.

Reference numbers in the figures are as follows: 10. Pot; 20. Pot Shield; 30. Infrared Stove; 40. Gas Tank; 50. Pressure Maintaining Valve; 70. Pot Cover; 80. Handle; 90. Support Leg; 91. Gasket; 100. Fixing Ring; 110. Heat Collecting Ring; 120. Container; 31. Ejector Tube; 32. Blasting Bead; 33. Infrared Reaction Layer; 34. Connecting Base; 35. Connecting Conduit; 36. Inner cover; 37. Outer Casing; 38. Web; 39. Riveting Piece; 301. Stove Body; 302. Gas Nozzle; 303. First Accommodating Cavity; 304. Second Accommodating Cavity; 371. Air Inlet; 31*a*. First end of Ejector Tube; 31*b*. Second end of Ejector Tube; 31*c*. Mounting Slot; 31*d*. Gas Inlet; 361. Groove; 901. Limiting Column; 911. Arc-shaped Limiting Groove; 1201. Concave Part; 1202, Third Accommodating Cavity; 381. Convex Part; 341. Nut; 331. Sheet; 51. Valve Body; 52. Stem; 53. Adjusting Rod; 54A. Rear Spring; 54B. Front Spring; 55. Diaphragm; 56. Diaphragm Pressing Nail; 57. Throttle Spool; 58. Throttle Ring; 59. Throttle; 60. Slide Bead; 61. Rear Cap; 5101, Inlet of Valve Body; 5102. Outlet of Valve Body.

DETAILED DESCRIPTION

In the following, is a detailed and complete description of the present disclosure will be made in combination with specific embodiments with reference to the drawings.

Referring to FIGS. 1 to 7, the present disclosure provides an infrared stove 30, which includes a stove body 301, an ejector tube 31, a gas nozzle 302 and an infrared reaction layer 33. The ejector tube 31 is arranged in the stove body 301, and the infrared reaction layer 33 is arranged on the stove body 301 and above the ejector tube 31. The gas nozzle 302 is arranged on the stove body 301 and is arranged immediately opposite to the gas inlet 31*d* of the ejector tube 31 and at a spacing.

When the infrared stove 30 operates, with the gas nozzle 302 externally connected with the gas, the gas sprayed from the gas nozzle 302 enters the ejector tube 31, and meanwhile, due to a high-speed motion of a gas flow, the air is injected into the ejector tube 31, so that the gas and air are premixed in the ejector tube 31, and then the mixed gas enters the first accommodating cavity 303 for a further mixing. The uniformly distributed mixed gas passes through the infrared reaction layer 33 and burns on a surface of the infrared reaction layer 33, and the infrared reaction layer 33 is heated to a white heat state after the premixed high-temperature gas is burned, so that infrared rays are radiated outwards to realize a heating. The infrared stove 30 is flameless, safer and more stable in combustion.

The infrared reaction layer 33 can be an infrared radiator, which generates a highly directional infrared radiation source by burning the gas inside the stove body 301 to heat to a corresponding temperature.

Specifically, the stove body 301 includes an outer casing 37 and an inner cover 36 which are nested with each other to foam the stove body 301. A first accommodation chamber 303 is provided between the infrared reaction layer 33 and the inner cover 36. A second accommodation chamber 304 is provided between the inner cover 36 and the outer casing 37. The outer casing is provided with an air inlet 371 communicated with outside, so that the second accommodation chamber 304 communicates with the outside air. A first end 31*a* of the ejector tube is provided on the inner cover 36, the ejector tube 31 communicates with the first accommodating cavity 303 and the second accommodating cavity 304, and the gas nozzle 302 is arranged on the outer casing 37, and is arranged immediately opposite to the second end 31*b* of the ejector tube and at a spacing. The ejector tube 31 may be mounted inside the inner cover 36 or outside the inner cover 36.

As shown in FIG. 1, in a mounting mode of the ejector tube 31, the ejector tube 31 is located in the first accommodating cavity 303, that is, the ejector tube 31 is mounted inside the inner cover 36. When assembling and disassembling the ejector tube 31, it is necessary to remove the inner cover 36.

Figure 2:
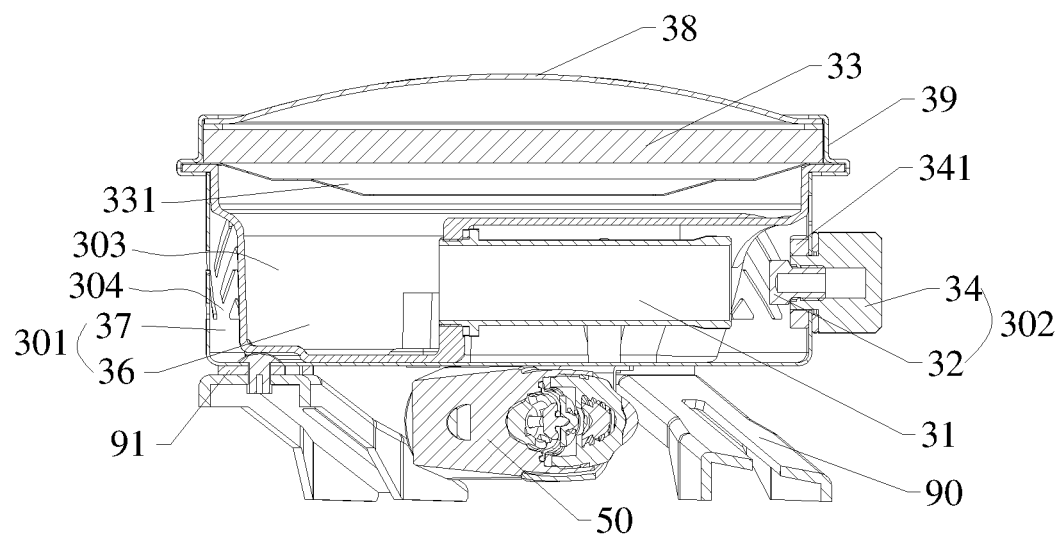
FIG. 2 is a sectional view of an infrared stove according to another embodiment of the present disclosure.
Figure 3:
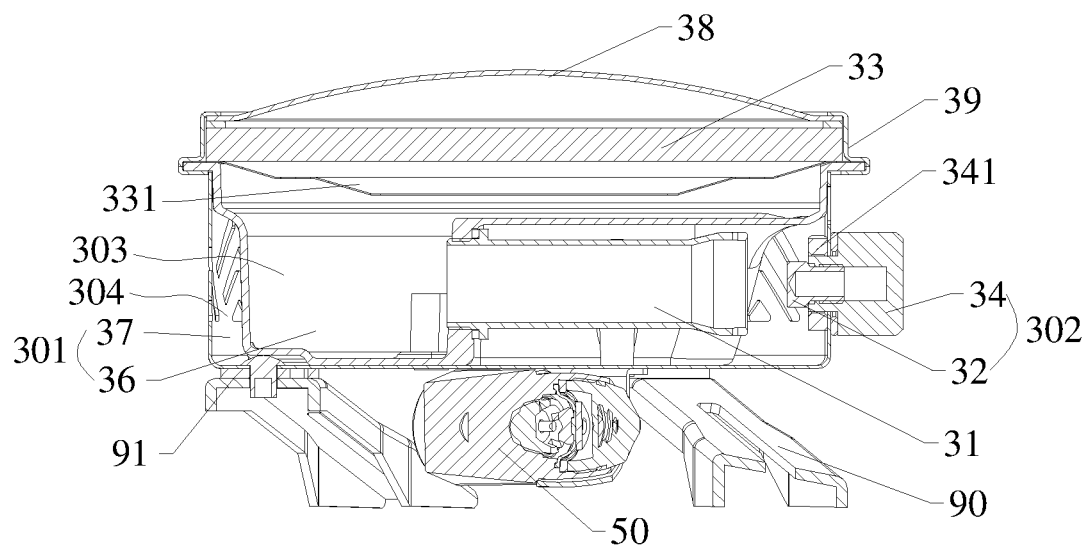
FIG. 3 is a sectional view of an infrared stove according to yet another embodiment of the present disclosure.
Figure 4:
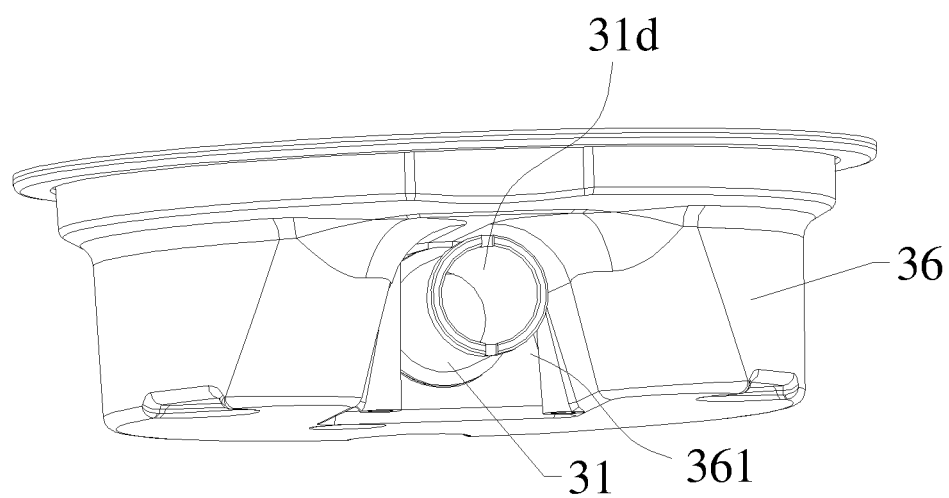
FIG. 4 is a schematic diagram of a fitting structure of an inner cover and an ejector tube according to an embodiment of the present disclosure.

As shown in FIGS. 2 to 4, in another mounting mode of the ejector tube 31, the ejector tube 31 is located in the second accommodating cavity 304, that is, the ejector tube 31 is mounted outside the inner cover 36. When assembling and disassembling the ejector tube 31, it is not necessary to disassemble the inner cover 36, and it is convenient to assemble and disassemble the ejector tube 31.

As shown in FIG. 4, in an embodiment, the inner cover 36 is provided with a groove 361 recessed toward the first accommodating cavity 303. Because the ejector tube 31 is located in the groove 361 in an outer side of the inner cover 36, the inner cover 36 and the ejector tube 31 occupy a small space and is with a reasonable structural design.

In an embodiment, the second end 31*b* of the ejector tube is an expansion opening or a straight cylindrical opening. The gas inlet 31*d* at the second end of the ejector tube 31 is concentric with an injection port of the gas nozzle 302. As shown in FIG. 3, the expansion opening is of a structure in which the gas inlet 31*d* at the second end of the ejector tube 31 is involute conically towards the gas nozzle 302. As shown in FIG. 2, the straight cylindrical opening is of a structure in which the gas inlet 31*d* at the second end of the ejector tube 31 is in a form of straight cylinder towards the gas nozzle 302. For the ejector tube 31 with a same diameter, a diameter of the expansion opening is larger than the diameter of the straight cylindrical opening. An inlet of the ejector tube 31 is provided with an expansion opening structure, which has a larger area for aligning with the injection port of the gas nozzle 302, and can better guide the gas and air. Of course, the ejector tube 31 of a straight opening structure can achieve a purpose of guiding gas and air by adjusting a distance between the ejector tube 31 and the gas nozzle 302.

Figure 5:
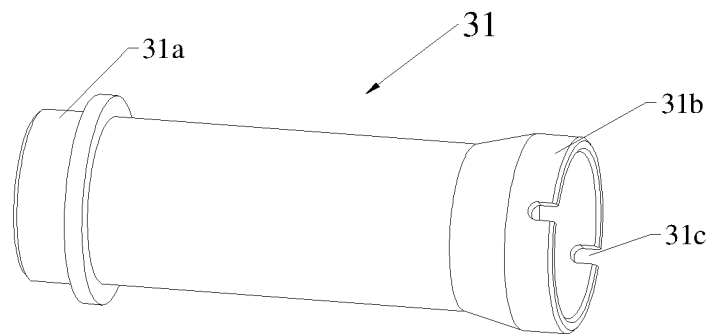
FIG. 5 is a schematic structural diagram of an ejector tube according to an embodiment of the present disclosure.
Figure 6:
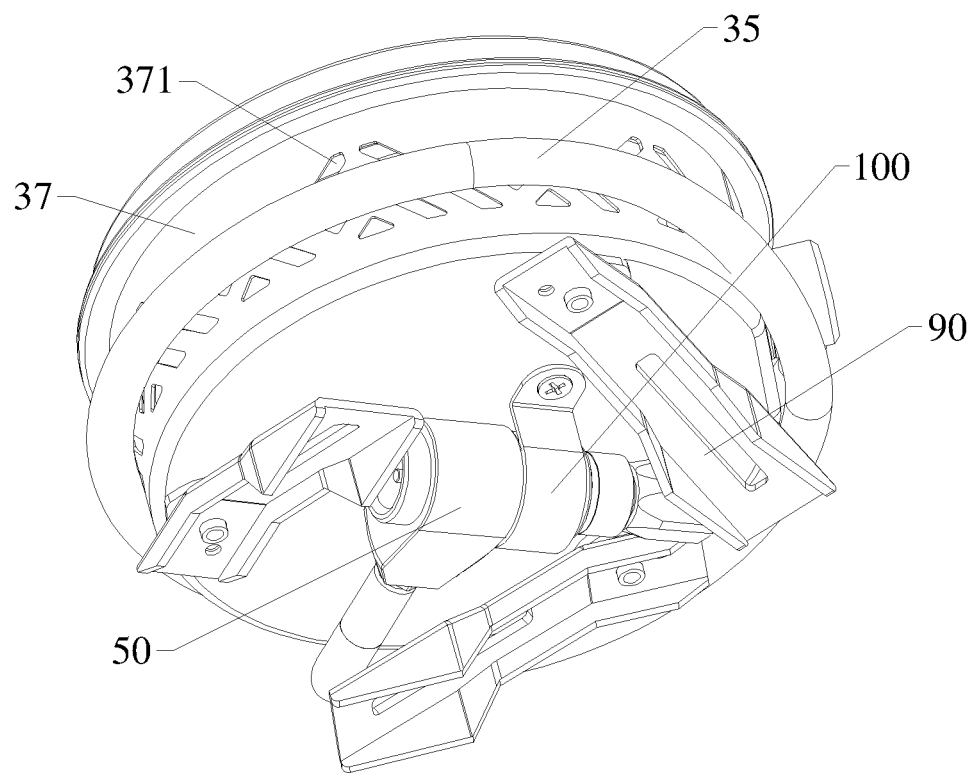
FIG. 6 is a schematic diagram of a bottom structure of an infrared stove according to an embodiment of the present disclosure.
Figure 7:
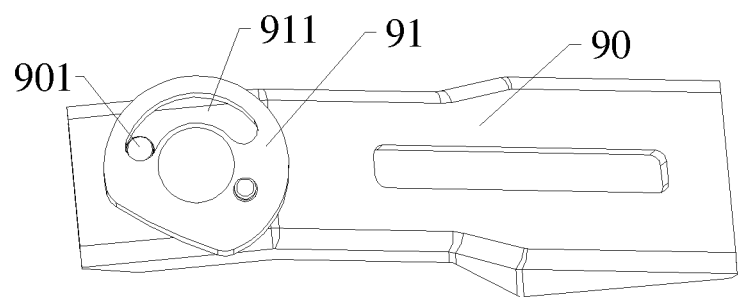
FIG. 7 is a schematic diagram of an assembly structure of a supporting leg and a gasket of the present disclosure.
Figure 8:
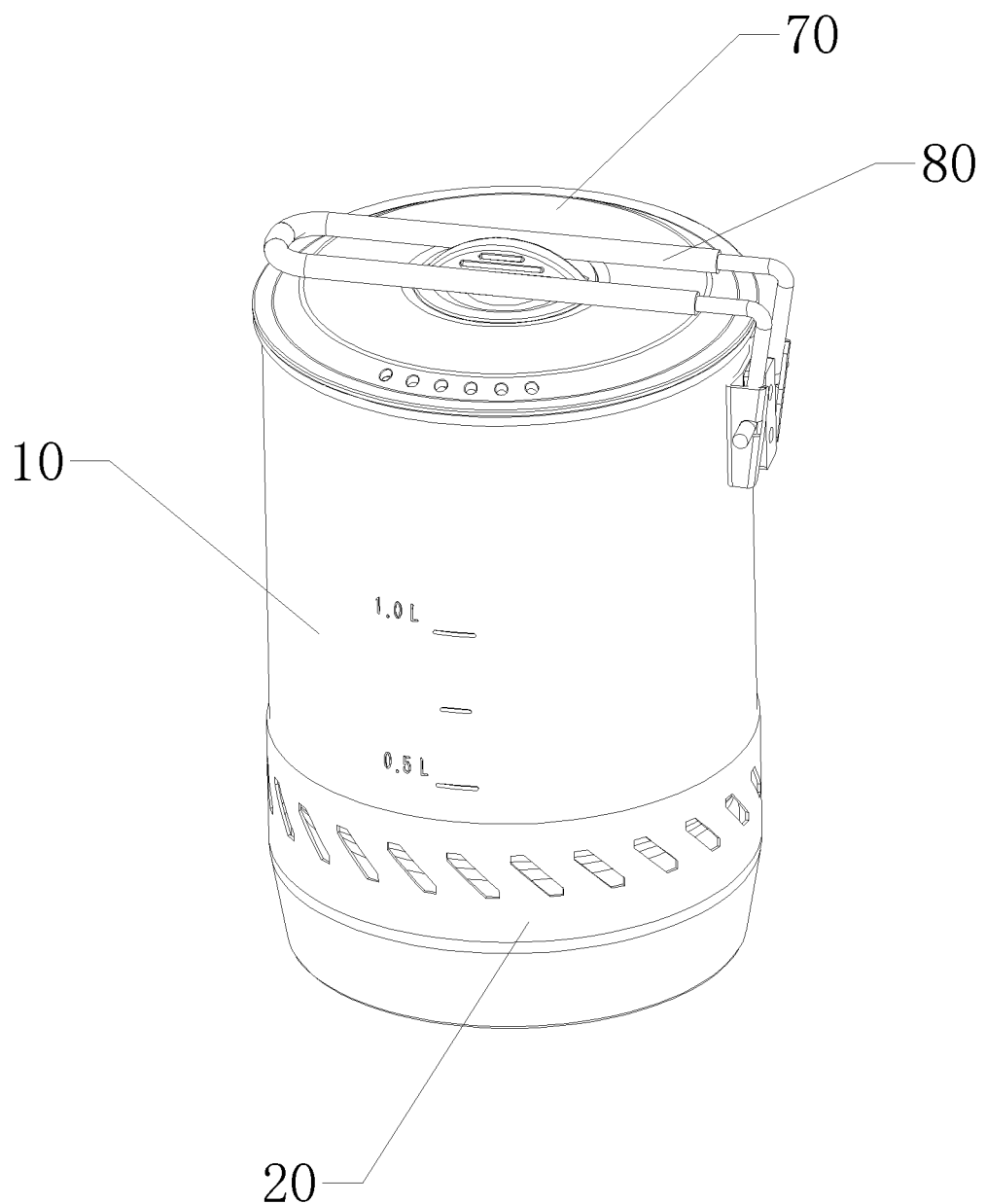
FIG. 8 is a schematic structural diagram of an infrared split stove set according to an embodiment of the present disclosure.

As shown in FIG. 5, in an embodiment, the second end 31*b* of the ejector tube is provided with one or more mounting slots 31*c*. When disassembling and assembling the ejector tube 31, a disassembly/assembly tool such as a flat-bladed screwdriver can be inserted into the mounting slot 31*c* to facilitate the disassembly and assembly of the ejector tube 31. As shown in FIGS. 6 to 7, in an embodiment, the infrared stove 30 further includes a plurality of supporting legs 90 and a plurality of gaskets 91. The plurality of gaskets 91 are arranged at a bottom of the outer casing 37 at spacings, and the plurality of supporting legs 90 and the plurality of gaskets 91 are arranged in one-to-one correspondence. The supporting leg 90 is rotatably matched with the gasket 91. The gasket 91 is provided with an arc-shaped limiting groove 911, and the supporting leg 90 is provided with a limiting column 901 which is slidably matched with the arc-shaped limiting groove 911.

In this embodiment, the infrared stove 30 is provided with a plurality of supporting legs 90. All of the supporting legs 90 are rotatably mounted on the bottom of the outer casing 37 at spacings so as to be rotated and stored at a bottom of the infrared stove 30. Rotation of the supporting leg 90 is realized by a slidable matching between the arc-shaped limiting groove 911 on the gasket 91 and the limiting column 901 on the supporting leg 90. In this embodiment, the number of supporting legs 90 is three, and the three supporting legs 90 are distributed at spacings, and each supporting leg 90 is rotatably mounted at the bottom of the infrared stove 30 through the gasket 91 and a pin shaft. In this way, when the infrared split stove set is used, the user can rotate the supporting leg 90 so that ends of all of the supporting leg 90 extend out of the infrared stove 30 and brace against the ground. When the infrared split stove set is to be stored, all of the supporting leg 90 can be rotated into the bottom of the infrared stove 30 without being exposed, which can reduce the occupied space and facilitate a storage.

Referring to FIGS. 1 to 12, the present disclosure also provides an infrared split stove set, which includes a pot 10, a pot shield 20, a gas tank 40, a pressure maintaining valve 50, a connecting conduit 35, and the infrared stove 30 described above. The pot 10 is in an elongated cylindrical shape and has a cavity for cooking therein. The pot shield 20 is a hollow annular body, and is braced against the bottom of the pot 10, and the pot 10 is embedded and fit to the pot shield 20. The infrared stove 30 is detachably braced against the bottom of the pot shield 20, and is embedded in the pot shield 20 to heat the pot 10 for cooking food. A first end of the connecting conduit 35 is connected with the gas nozzle 302, and a second end of the connecting conduit 35 is connected with a pressure maintaining valve 50 which is detachably connected with an outlet of the gas tank 40.

The infrared split stove set also includes a pot cover 70 and a handle 80. The pot cover 70 covers a top of the pot 10. The handle 80 is L-shaped with one end rotatably connected to a side wall of the pot 10, and the user can rotate the handle 80 to make the other end of the handle 80 abut against the pot cover 70 or move away from the pot cover 70.

The gas nozzle 302 includes a blasting bead 32 and a connecting base 34. The connecting base 34 is embedded on the outer casing 37 through a nut 341, the blasting bead 32 is mounted to an inner side of the connecting base 34, and the gas forms a high-pressure gas flow through the blasting bead 32 and injects into the ejector tube 31. A first end of the connecting conduit 35 is mounted to an outer side of the connecting base 34 to be externally connected with the gas. The gas tank 40 is used for containing combustion gas, the pressure maintaining valve 50 is used for connecting with the outlet of the gas tank 40, and the second end of the connecting conduit 35 is communicated with the gas tank 40 through the pressure maintaining valve 50, so that the gas is sprayed through the blasting bead 32 and inject the air into the ejector tube 31.

When the infrared stove 30 operates, the gas in the gas tank 40 reaches the blasting bead 32 through the connecting conduit 35 and is sprayed out, while the injected air enters the ejector tube 31 together, the air and the gas are premixed in the ejector tube 31. The mixed gas enters the inner cover 36 for further mixing, the uniformly distributed mixed gas passes through the infrared reaction layer 33 and burns on a surface of the infrared reaction layer 33, and the infrared reaction layer 33 is heated to a white heat state after the premixed high-temperature gas is burned, thereby radiating infrared rays outwards to realize a heating for the pot 10.

Figure 12:
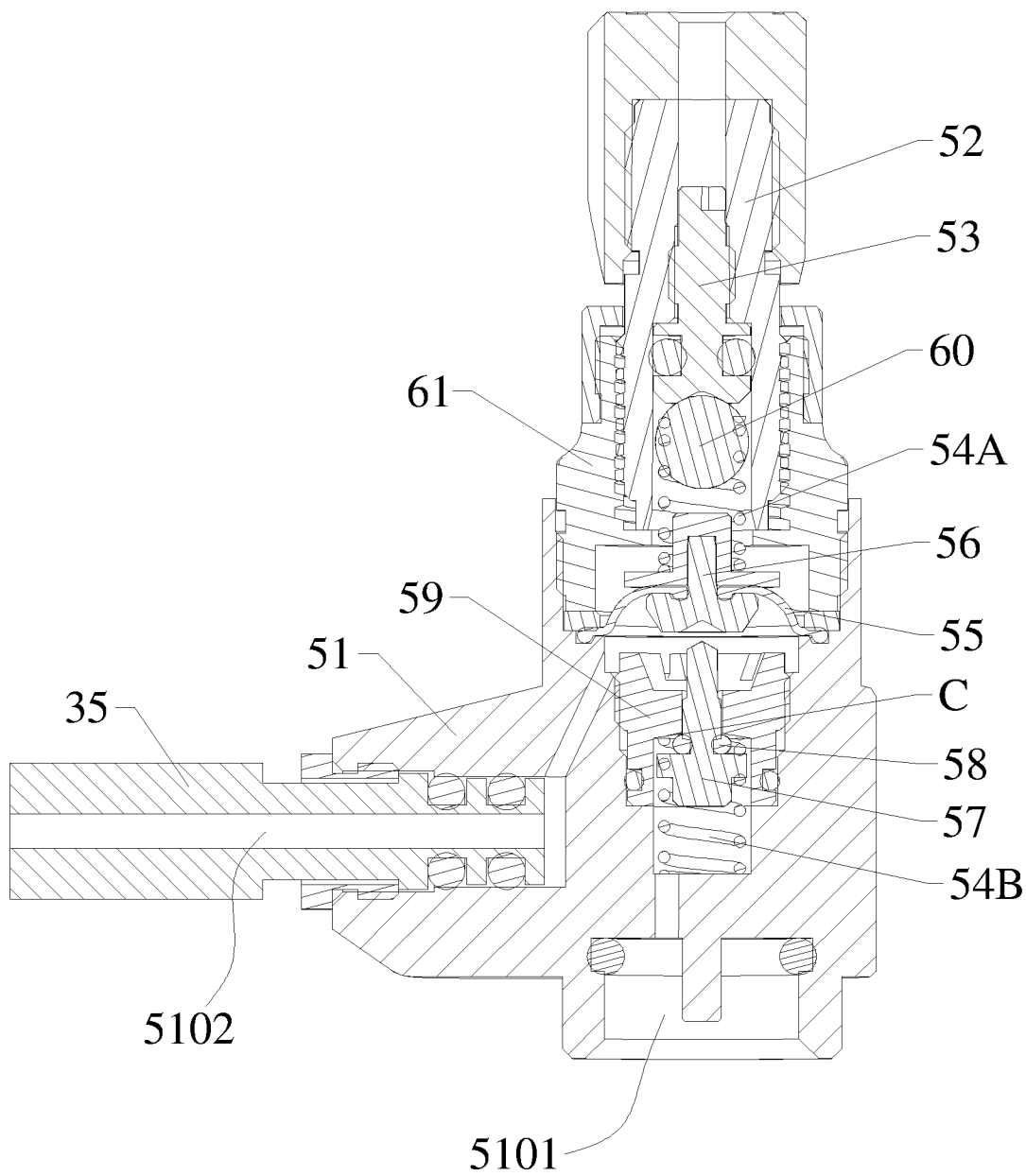
FIG. 12 is a sectional view of a pressure maintaining valve according to an embodiment of the present disclosure.

Further, as shown in FIG. 12, the pressure maintaining valve 50 includes a valve body 51, a stem 52, an adjusting rod 53, a rear spring 54A, a front spring 54B, a diaphragm 55, a diaphragm pressing nail 56, a throttle spool 57, a throttle ring 58 and a throttle 59. An inlet 5101 of the valve body is provided at a side of the valve body 51 and is communicated with the gas tank 40, and an outlet of the valve body 5102 is provided at the other side of the valve body 51 and is communicated with the connecting conduit 35. The stem 52 serves as a device for opening or closing an air passage, and the stem 52 is rotatably mounted to the valve body 51. The adjusting rod 53 is axially movably mounted inside the stem 52, and the adjusting rod 53 can preset a device with a rated output pressure. An end of that rear spring 54A is indirectly connected with the adjusting rod 53, and the other end of the rear spring 54A is connected with the diaphragm pressing nail 56. A diaphragm pressing nail 56 is mounted integrally with the diaphragm 55. The diaphragm pressing nail 56 penetrates through the diaphragm 55, one end of the diaphragm pressing nail 56 contacts the throttle spool 57 and the other end of the diaphragm pressing nail 56 contacts the rear spring 54A, and the diaphragm 55 can be pressingly clamped in inner walls on both sides of the valve body 51. A throttle spool 57 is mounted in the valve body 51, one end of the throttle spool 57 contacts the diaphragm pressing nail 56, and the front spring 54B is sleeved on the other end of the throttle spool 57 and located at the inlet 5101 of the valve body. The throttle ring 58 is sleeved on the throttle spool 57. The throttle 59 is mounted on the inner wall on a side of the valve body 51 and communicated with the outlet 5102 of the valve body, and the throttle ring 58 is detachably contacted with the throttle 59 at an opening and closing point C of the air passage. When the stem 52 is rotated, the stem 52 pushes the rear spring 54A and thus push the diaphragm pressing nail 56 and diaphragm 55 to move toward the front spring 54B, then the diaphragm pressing nail 56 pushes the throttle spool 57 to move, and the throttle spool 57 in turn drives the throttle ring 58 to move. When the throttle ring 58 leaves the opening and closing point C of the gas passage where it contacts the throttle 59, the gas passage is turned on and the gas can enter the connecting conduit 35 through the throttle 59 and finally be sprayed out through the blasting bead 32, and at the same time the air is injected for premixing with the gas, which then are discharged from the burner and ignited to burn to do work. When a pressure in the gas tank 40 changes, the gas pressure acts on the diaphragm 55, causing the diaphragm 55 to move, thus pushing the diaphragm pressing nail 56 and diaphragm 55 to move, which in turn drives the throttle spool 57 to move and the throttle spool 57 drives the throttle ring 58 to move, thus changing a size of the closing point of the gas passage where the throttle ring 58 contacts the throttle 59. The throttle spool 57, the throttle ring 58 and the throttle 59 cooperate to serve as an opening and closing device, which controls an opening or closing degree of the gas passage through a distance between the throttle ring 58 and the throttle 59, so as to adjust an amount of the gas output and achieve the purpose of adjusting and stabilizing the air pressure. The rear spring 54A, the front spring 54B and the diaphragm 55 cooperate to form an opening and closing adjusting device, which adjusts, by using the gas pressure, the opening or closing of the opening and closing device and a size of the air passage through a compression or expansion of the springs.

As shown in FIG. 12, the pressure maintaining valve 50 further includes a slide bead 60 which is arranged between the adjusting rod 53 and the rear spring 54A, and a contact surface between the adjusting rod 53 and the slide bead 60 is a spherical surface. By additionally providing the slide bead 60 between the rear spring 54A and the adjusting rod 53 and making the contact surface between the adjusting rod 53 and the slide bead 60 be a spherical surface, it can be avoided that in a case where a stress generated due to the adjusting rod 53 rotating to drive the rear spring 54A to rotate, an adjustment effect is changed after the stress is relieved in the later stage.

As shown in FIG. 12, the pressure maintaining valve 50 further includes a rear cap 61 which is fit on a side of the valve body 51 opposite to the inlet 5101 of the valve body and nested on an outer periphery of the stem 52. In this way, the valve body 51 of the pressure maintaining valve 50 is divided into front and rear cavities by the throttle 59 and the rear cap 61, so that an assembly can be carried out on a side of the pressure maintaining valve 50, and misoperations in the equipment can be avoided to a certain extent.

Figure 11:
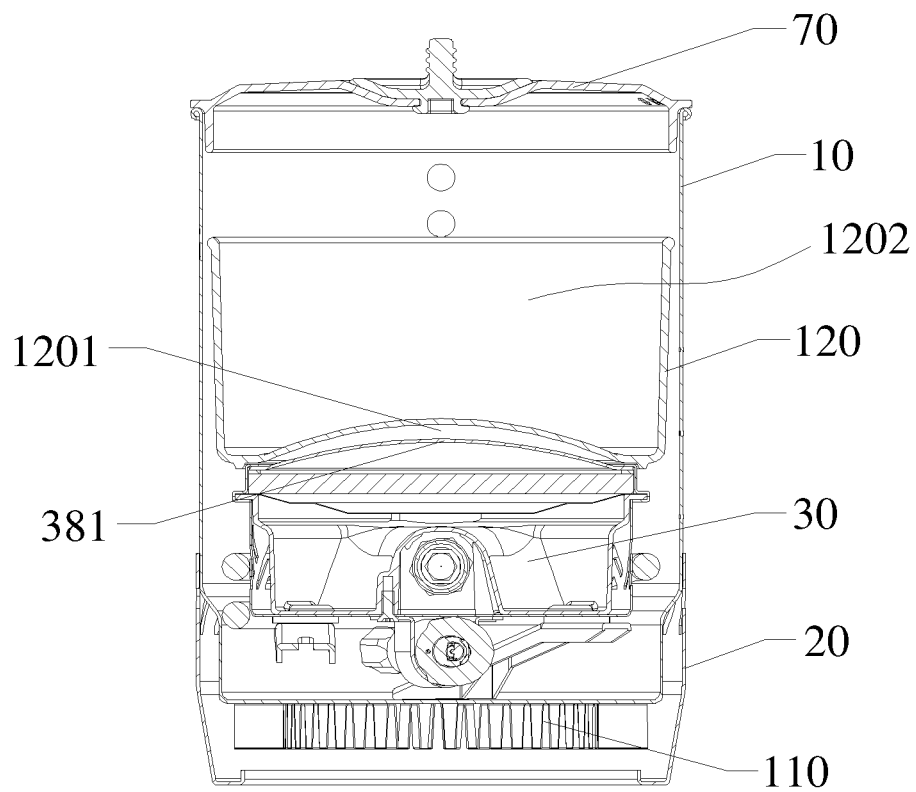
FIG. 11 is a sectional view of an infrared split stove set in a storage state according to an embodiment of the present disclosure.

As shown in FIGS. 1 to 3, in an embodiment, the infrared split stove set further includes a web 38 and a riveting piece 39, and the web 38 is fixed to a top of the infrared reaction layer 33 by the riveting piece 39. A sheet 331 is fixed to a bottom surface of the infrared reaction layer 33. As shown in FIG. 11, a bottom of the container 120 is provided with a concave part 1201 which is recessed toward the third accommodating cavity 1202, and the web 38 is provided with a convex part 381 which protrudes away from the infrared reaction layer 33, and the concave part 1201 is matched with the convex part 381. When the infrared split stove set is in a storage state, the container 120 is placed above the infrared stove 30, and the concave part 1201 at the bottom of the container 120 is matched with the convex part 381 on the web 38 to prevent shaking during transportations, thereby reducing a risk of damage to the infrared stove 30, the container 120 and the gas tank 40 in the container 120 during transportations, and being safer.

As shown in FIG. 6, in an embodiment, a bottom of the outer casing 37 is provided with a fixing ring 100 for fixing the pressure maintaining valve 50. When the infrared split stove set is to be stored, the user can separate the pressure maintaining valve 50 from the gas tank 40, and then wrap the connecting conduit 35 around an outer wall of the infrared stove 30 to fix the pressure maintaining valve 50 in the fixing ring 100.

Figure 9:
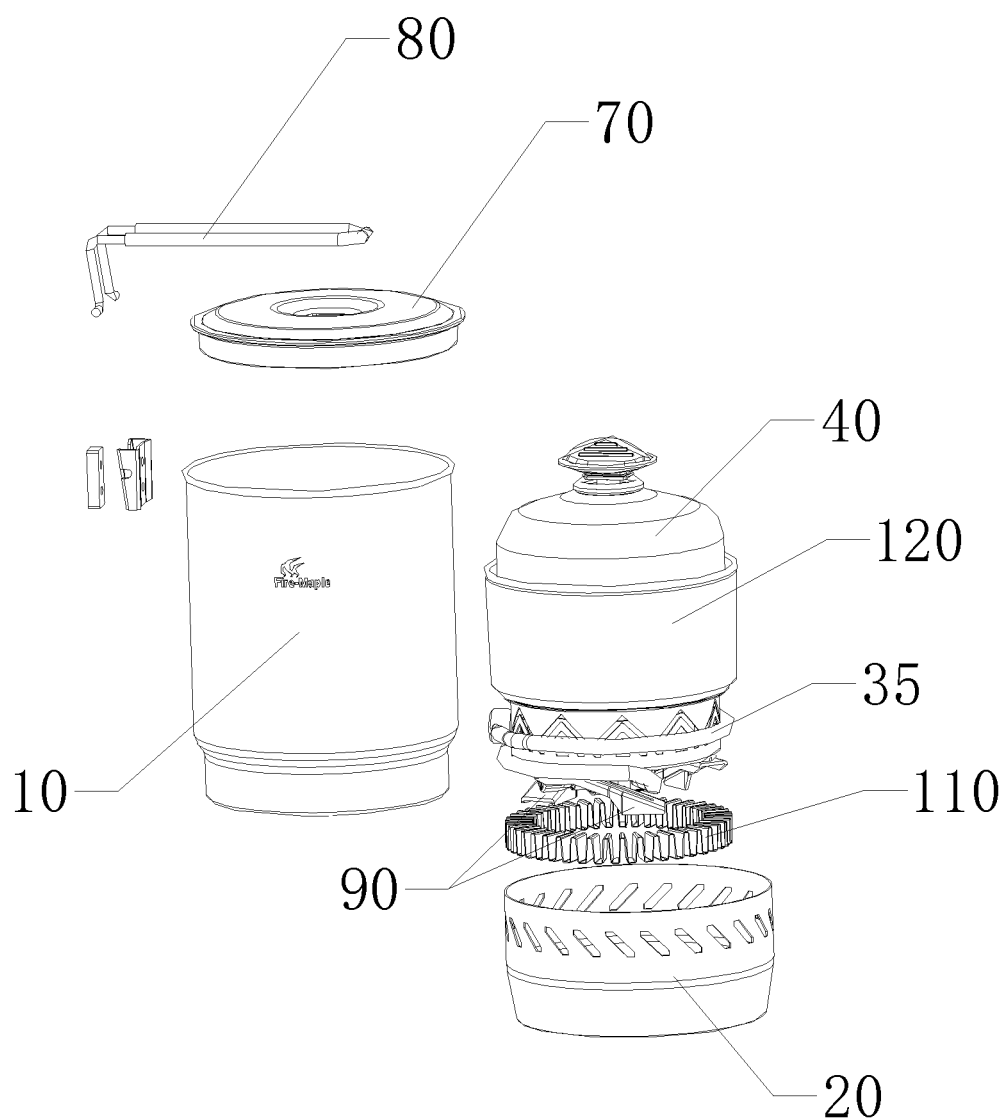
FIG. 9 is an exploded structural diagram of an infrared split stove set according to an embodiment of the present disclosure.
Figure 10:
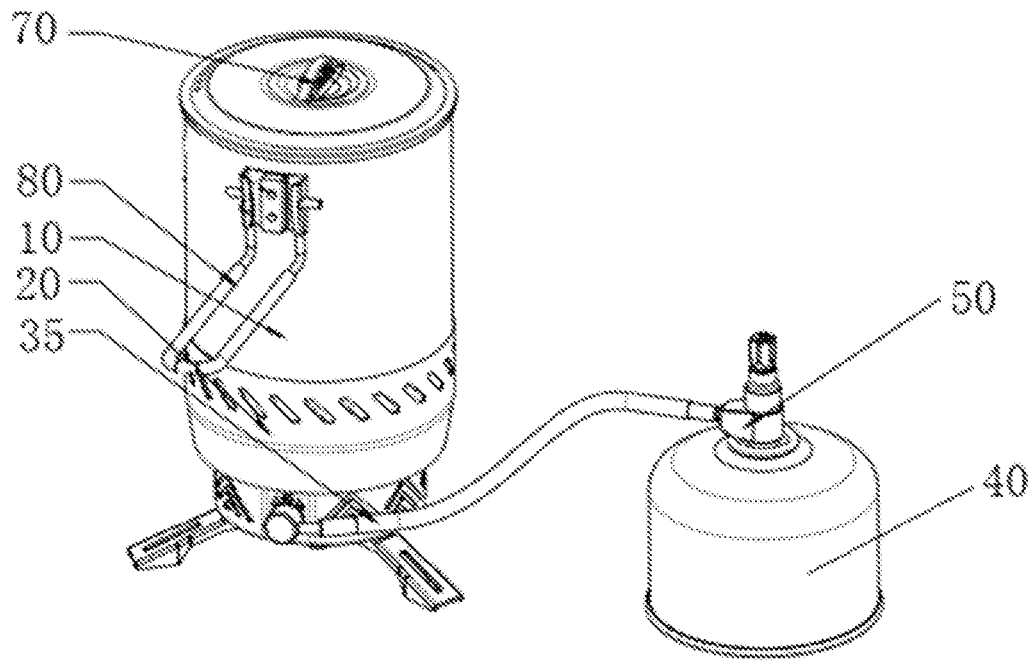
FIG. 10 is a schematic structural diagram of an infrared split stove set in a using state according to an embodiment of the present disclosure.

As shown in FIGS. 9 and 11, in an embodiment, the infrared split stove set further includes a heat collecting ring 110, which is mounted at a bottom of the pot shield 20.

As shown in FIG. 9 and FIG. 11, in an embodiment, the infrared split stove set further includes a container 120 which is placed in the pot 10 and provided with a third accommodating cavity 1202 therein. A size of the gas tank 40 is smaller than a size of the third accommodating cavity 1202, and the gas tank 40 can be put into the third accommodating cavity 1202 of the container 120. A size of the infrared stove 30 is smaller than that of an internal cavity of the pot 10, and the infrared stove 30 can be put into the internal cavity of the pot 10.

When the container 120 and the gas tank 40 are of cylindrical structures, the size of the gas tank 40 being smaller than the size of the third accommodating cavity 1202 means that a diameter and height of the gas tank 40 are both smaller than those of the third accommodating cavity 1202.

In this embodiment, when the infrared split stove set is stored, the connecting conduit 35 is reversely wound and stored on the outer wall of the infrared stove 30, the pressure maintaining valve 50 is fixed in the fixing ring 100 at the bottom of the infrared stove 30, and the supporting legs 90 are rotated and tightly stored. Then the whole infrared stove 30 is moved into the pot 10 from the bottom of the pot shield 20 together with the supporting legs 90, then the container 120 is placed above the infrared stove 30 and the gas tank 40 is loaded into the container 120. Finally, the pot cover 70 is covered and the handle 80 is rotated to abut against and fix the pot cover 70.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. An infrared split stove set, comprising a pot, a pot shield, an gas tank, a pressure maintaining valve, a connecting conduit and an infrared stove,
    wherein the pot is hollow;
    the pot shield is hollow and braced against a bottom of the pot;
    wherein the infrared stove detachably braces against the bottom of the pot shield and embedded in the pot shield;
    a first end of the connecting conduit is connected with the gas nozzle, a second end of the connecting conduit is connected with the pressure maintaining valve; and
    the pressure maintaining valve is detachably connected with an outlet of the gas tank;
    wherein the infrared stove comprises:
        an outer casing;
        an inner cover;
        an ejector tube;
        a gas nozzle; and
        an infrared reaction layer,
        wherein the inner cover is nested with the outer casing to form an stove body, the infrared reaction layer is provided on the stove body, a first accommodating cavity is provided between the infrared reaction layer and the inner cover, a second accommodating cavity is provided between the inner cover and the outer casing, the outer casing is provided with an air inlet communicated with outside, the ejector tube is arranged on the inner cover, communicates with the first accommodating cavity and the second accommodating cavity, and is provided with a gas inlet, and the gas nozzle is arranged on the outer casing, and is arranged immediately opposite to the gas inlet and at a spacing.

2. The infrared split stove set according to claim 1, wherein the pressure maintaining valve comprises:
    a valve body, on one side of which an inlet is provided and is communicated with the gas tank, and on the other side of which an outlet is provided and is communicated with the connecting conduit;
    a stem rotatably mounted to the valve body;
    an adjusting rod axially and movably mounted inside the stem;
    a rear spring, of which an end is connected with the adjusting rod;
    a diaphragm;
    a diaphragm pressing nail mounted integrally with the diaphragm, so that the membrane is pressingly clamped in inner walls on both sides of the valve body, the other end of the rear spring being connected with the diaphragm pressing nail;
    a throttle spool mounted in the valve body, of which one end contacts the diaphragm pressing nail;
    a throttle ring sleeved on the throttle spool;
    a front spring sleeved on the other end of the throttle spool and located at the inlet; and
    a throttle mounted on the inner wall on a side of the valve body and communicated with the outlet, the throttle ring being detachably contacted with the throttle at an opening and closing point of an air passage.

3. The infrared split stove set according to claim 2, wherein the pressure maintaining valve comprises a slide bead which is arranged between the adjusting rod and the rear spring, and a contact surface between the adjusting rod and the slide bead is a spherical surface.

4. The infrared split stove set according to claim 2, wherein the pressure maintaining valve comprises a rear cap which is fit on a side of the valve body opposite to the inlet and nested on an outer periphery of the stem.

5. The infrared split stove set according to claim 1, wherein the infrared split stove set further comprises a container which is arranged in the pot and provided with a third accommodating cavity therein.

6. The infrared split stove set according to claim 5, wherein a size of the gas tank is smaller than a size of the third accommodating cavity, and a size of the infrared stove is smaller than a size of an internal cavity of the pot.

7. The infrared split stove set according to claim 6, wherein the infrared split stove set further comprises a web and a riveting piece, wherein the web is fixed to a top of the infrared reaction layer through the riveting piece.

8. The infrared split stove set according to claim 7, wherein a bottom of the container is provided with a concave part which is recessed toward the third accommodating cavity, and the web is provided with a convex part which protrudes away from the infrared reaction layer, the concave part being matched with the convex part.

9. The infrared split stove set according to claim 1, wherein a bottom of the outer casing is provided with a fixing ring for fixing the pressure maintaining valve.

10. The infrared split stove set according to claim 1, wherein the infrared split stove set includes a heat collecting ring, which is mounted at the bottom of the pot shield.

11. The infrared split stove set according to claim 1, wherein the ejector tube is located in the first accommodating cavity or the second accommodating cavity.

12. The infrared split stove set according to claim 11, wherein the ejector tube is located in the second accommodating cavity, and the inner cover is provided with a groove which is recessed toward the first accommodating cavity, and the ejector tube is located in the groove.

13. The infrared split stove set according to claim 12, wherein the gas inlet is a straight cylindrical opening or an expansion opening.

14. The infrared split stove set according to claim 1, wherein the infrared stove further comprises a plurality of supporting legs, and all of the supporting leg are arranged at spacings and rotatably at a bottom of the infrared stove.

15. The infrared split stove set according to claim 14, wherein a gasket is provided between the bottom of the infrared stove and the supporting leg, the gasket is mounted on the bottom of the infrared stove, the supporting leg is rotatably mounted on the gasket, the gasket is provided with an arc-shaped limiting groove, and the support leg is provided with a limiting column which is slidably matched with the arc-shaped limiting groove.

* * * * *